(12) United States Patent
Vogel et al.

(10) Patent No.: US 6,959,007 B1
(45) Date of Patent: Oct. 25, 2005

(54) HIGH SPEED NETWORK PROTOCOL STACK IN SILICON

(75) Inventors: Danny C. Vogel, Sudbury, MA (US); Clinton P. Seeman, Blackstone, MA (US)

(73) Assignee: LSI Logic Corporation, Milpitas, CA (US)

( * ) Notice: Subject to any disclaimer, the term of this patent is extended or adjusted under 35 U.S.C. 154(b) by 910 days.

(21) Appl. No.: 09/888,902

(22) Filed: Jun. 25, 2001

Related U.S. Application Data

(60) Provisional application No. 60/273,072, filed on Mar. 1, 2001.

(51) Int. Cl.[7] ............................. H04L 12/28; H04J 3/16
(52) U.S. Cl. ...................... 370/469; 370/389; 710/313; 713/200
(58) Field of Search ................................ 370/389, 469, 370/386, 412; 719/219, 223; 710/52, 100, 710/313; 713/189, 200; 711/100

(56) References Cited

U.S. PATENT DOCUMENTS

| 6,034,963 A | 3/2000 | Minami et al. ............ 370/401 |
| 2004/0111523 A1 * | 6/2004 | Hall et al. ................. 709/230 |

* cited by examiner

*Primary Examiner*—Duc Ho
(74) *Attorney, Agent, or Firm*—Christopher P. Maiorana, P.C.

(57) ABSTRACT

An apparatus comprising a media access controller (MAC), a configurable packet switch, and a network protocol stack in silicon. The network protocol stack may be configured to couple the media access controller to the configurable packet switch.

19 Claims, 5 Drawing Sheets

HIGH SPEED NETWORK PROTOCOL STACK IN SILICON

This application claims the benefit of U.S. Provisional Application No. 60/273,072, filed Mar. 1, 2001, and is hereby incorporated by reference in its entirety.

FIELD OF THE INVENTION

The present invention relates to network protocol stack processing generally and, more particularly, to a method and/or architecture for a high speed TCP/IP/UDP protocol stack in silicon that may be used in internet Fiber Channel (iFC) and internet SCSI (iSCSI) designs.

BACKGROUND OF THE INVENTION

Referring to FIG. 1, a diagram of a conventional storage area network (SAN) installation 10 is shown. The SAN installation 10 includes a number of disk drives 12, a storage unit/controller 14, a storage area network (SAN) 16, a number of host/servers 18 and a router or local area network (LAN) 20 for external access to the storage system. The storage area network 16 can be implemented using SCSI or fiber channel (FC) protocols. However, SCSI and FC buses are distance limited. Constructing SANs to span a medium area network (MAN) or even a wide area network (WAN) is not viable with SCSI or FC busses. The servers 18 can be a bottleneck for several operations because all accesses must go through the servers 18. Although the servers 18 provide a useful necessary function by isolating the SAN 16 from the outside network, even with additional servers 18, a throughput constraint is introduced as the servers 18 direct all traffic and perform protocol conversions.

Internet SCSI and iFC are protocols for encapsulating (establishing and transporting) SCSI and FC commands across an internet protocol (IP) network instead of a direct SCSI or FC compatible cable. By using iSCSI or iFC, storage management software that was originally written for SCSI or FC can be used to make a remote disk or tape drive on a network operate like a local disk. The network can be a local area network such as ethernet or even the internet.

Internet SCSI (iSCSI) and iFC target rates of 1 Gbps and 10 Gbps. Current TCP/IP designs to support iSCSI and iFC can be slow and power hungry. Conventional designs use firmware based TCP/IP stacks, with additional software for iSCSI/iFC stacks, and additional Ethernet MAC hardware components. The firmware based TCP/IP stacks are executed on expensive network or high end processors. The conventional designs can be expensive, require a large chip count, require high power, and provide inadequate bandwidth (i.e., not scalable to 10 Gbps).

SUMMARY OF THE INVENTION

The present invention concerns an apparatus comprising a media access controller (MAC), a configurable packet switch, and a network protocol stack in silicon. The network protocol stack may be configured to couple the media access controller to the configurable packet switch.

The objects, features and advantages of the present invention include providing a method and/or architecture for high speed TCP/IP/UDP protocol stack in silicon that may (i) be used in internet Fiber Channel (iFC) and internet SCSI (iSCSI) designs, (ii) provide bandwidth support for 1 Gbps and 10 Gbps without an expensive network or high end processor, (iii) easily support and redirect control and data flows, (iv) provide support for security, (v) included ethernet MAC functionality, (vi) provide support for TCP/IP/UDP, as well as ease of extension to external SCTP protocols, and/or (vii) provide ease of extension by means of an external bus (e.g., RIO, PCI, PCI-x, etc.).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
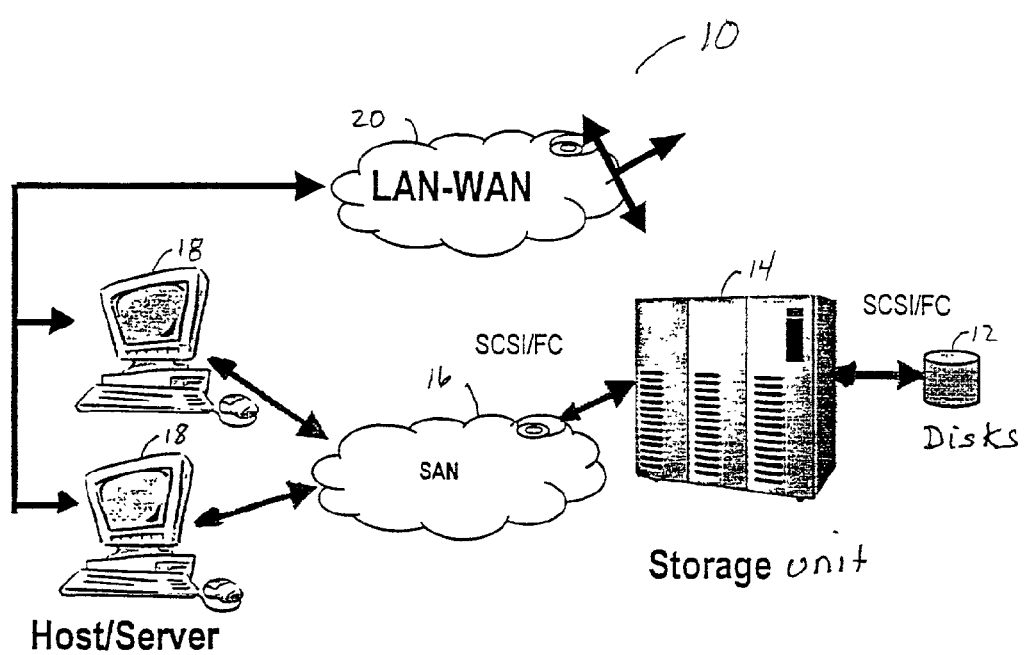
FIG. 1 is a block diagram or a storage area network (SAN)
Figure 2:
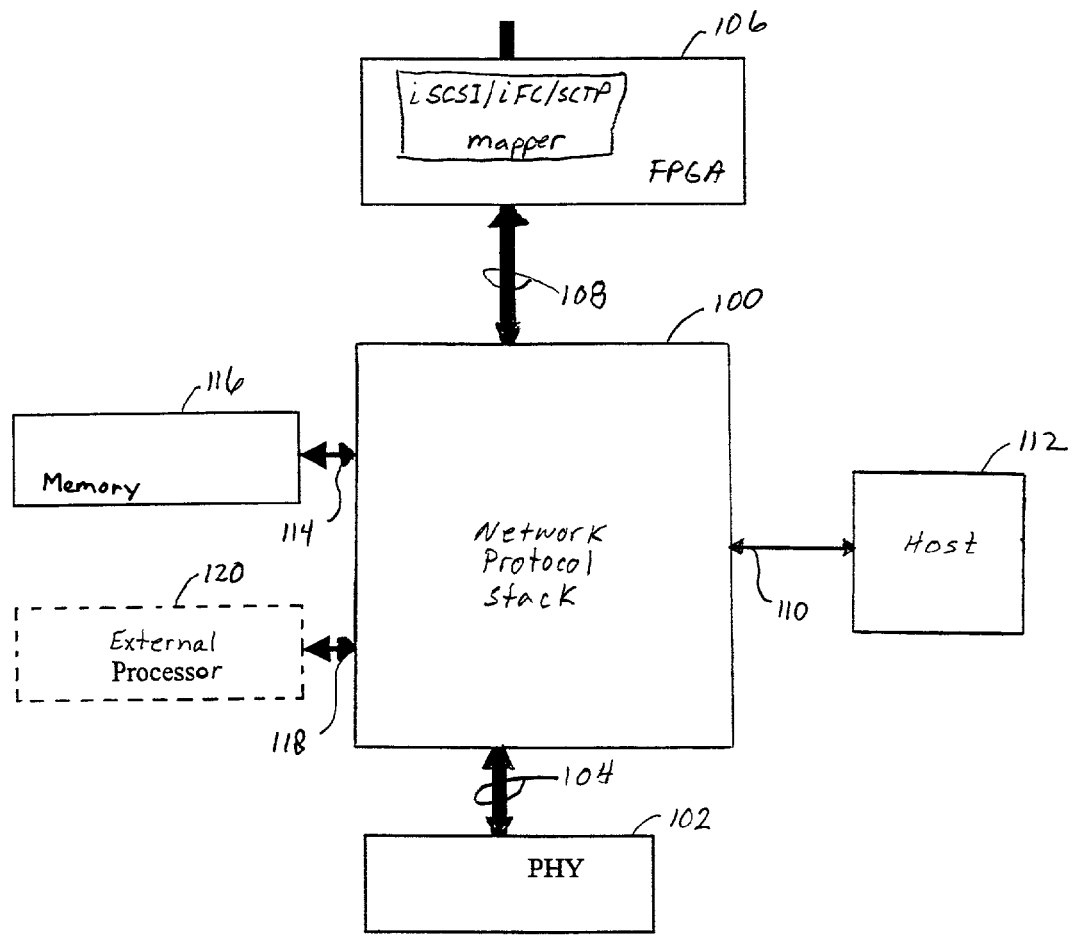
FIG. 2 is a block diagram of a preferred embodiment of the present invention.

Referring to FIG. 2, a block diagram of a system 100 is shown in accordance with a preferred embodiment of the present invention. The system 100 may be implemented as a high speed network protocol stack in silicon. In one example, the system 100 may be configured to support TCP/IP/UDP protocols in iFC and iSCSI designs. The system 100 may be connected to a physical layer device 102 via a bus 104 and a protocol mapper device 106 via a bus 108. In one example, the PHY 102 may be configured to operate at 1 Gbps rates. When the PHY 102 is configured to operate at 1 Gbps, the PHY 102 may support copper transceivers, optical transceivers, and 1000BASE-T twisted pair transceivers. Alternatively, the PHY 102 may be configured to operate at 10 Gbps. When the PHY 102 is configured to operate at 10 Gbps, the PHY 102 may be implemented as an optical transceiver, or a bus extender (e.g., a XGMII to XAUI adapter). When the PHY 102 is configured to operate at 1 Gbps, the bus 104 may be implemented as a standard GMII or RGMII bus. When the PHY 102 is configured to operate at 10 Gbps, the bus 104 may be implemented, in one example, as either an XGMII or XAUI bus. The protocol mapper 106 may be implemented, in one example, to provide SCSI block to TCP socket mapping and a protocol wrapper. The protocol mapper 106 may be implemented, in one example, using a field programmable gate array (FPGA). However, the protocol mapper 106 may be implemented using other types of devices (e.g., ASIC, DSP, PLD, CPLD, etc.). The bus 108 may be implemented, in one example, as a RapidIO bus (RIO). Alternatively, the bus 108 may be implemented as a PCI bus, a PCI-X bus, an SPI-4 bus, a 10 Gbps interface promoted by the Optical Internetworking Forum, or any other appropriate bus.

The system 100 may have an interface 110 that may be connected to a host 112, an interface 114 that may be connected to a memory block 116, and an interface 118 that may be connected to an external processor 120. The interface 114 may be implemented, in one example, as a double data rate (DDR) interface. The memory 116 may be implemented as RAM, SDRAM or any other type of memory appropriate to meeting the design criteria of a particular application. The processor 120 may be implemented, in one example, as a security processing chip. In one example, the processor 120 may be configured to implement an SSL and/or IPSec security protocol. The host 112 may be implemented as a processor (e.g., a Power PC) to implement an iSCSI control stack. The host 112 may be configured to control and manage the system 100. The host 112 may be further configured to process in-band control blocks (e.g., SMTP management).

Figure 3:
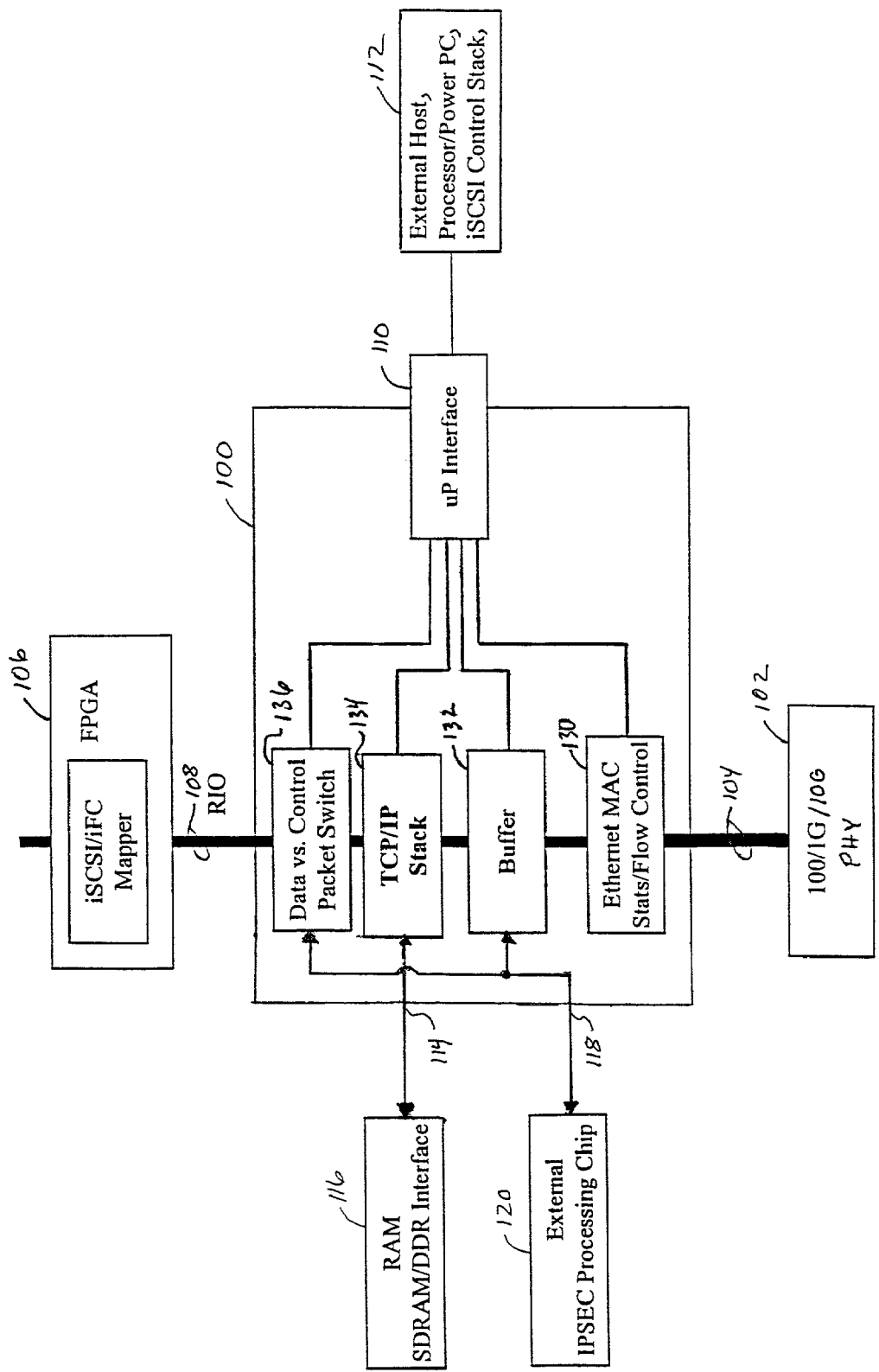
FIG. 3 is a detailed block diagram of the present invention.

Referring to FIG. 3, a more detailed block diagram of the system 100 is shown. The system 100 may comprise a circuit (block) 130, a circuit (block) 132, a circuit (block) 134, and a circuit (block) 136. The circuit 130 may be implemented as an ethernet MAC.

In one example, the circuit 130 may be implemented as a 100/1G/10G ethernet MAC. The circuit 130 may be configured to provide an external GMII and/or XGMII interface that may be coupled to the physical layer device 102 via the bus 104. The circuit 130 may be configured to run at any of a number of network speeds (e.g., 100 Mbps, 1 Gbps, 10 Gbps, etc.).

The circuit 132 may comprised of a buffer controller, a memory block, and a data switch. The memory block may be utilized to implement a FIFO memory to decouple the MAC 130 from the remainder of the circuit (e.g., in terms of data movement). The buffer controller may be configured to implement the normal aspects of a FIFO, as well as those aspects unique to Ethernet. For example, the buffer controller may be configured to retain initial data octets of a transmitted packet in the FIFO until after an early collision threshold has been passed, in order to allow for automatic retransmission, in accordance with the Ethernet standard. The data switch block functionality may be split between the circuit 132 and the circuit 136. The data switch block in the circuit 132 may be configured to detect encrypted blocks (e.g., IPSec), or blocks to be encrypted utilizing IPSec, and direct the blocks to the external IPSec/SSL co-processing chip 120 via the interface (port) 118. Within the circuit 136, the data switch block may be configured to detect blocks to be encrypted (e.g., utilizing SSL), or that are encrypted utilizing SSL, and direct the blocks to the external IPSec/SSL co-processing chip 120 via the interface 118.

The circuit 134 may be implemented, in one example, as a TCP/IP stack in silicon. The circuit 134 may be configured to support IP, TCP, UDP, and other transport layer type protocols. The circuit 134 may be configured to run the IP protocol and TCP, UDP and/or other protocols simultaneously at greater than 1 Gbps rate. The circuit 134 may be coupled to the memory 116 via the interface 114. The circuit 134 may be implemented, in one example, similarly to a circuit described in a co-pending patent application U.S. Ser. No. 09/888,866 which is hereby incorporated by reference in its entirety.

The circuit 136 may be implemented as a configurable packet switch. The circuit 136 may be configured to switch packets (e.g., SCSI packets) to either the circuit 106 (e.g., via the bus 108) or to an external processor for management and control processing. The circuits 130, 132, 134, and 136 may be controlled and managed by the host 112 via the interface 110.

Figure 4:
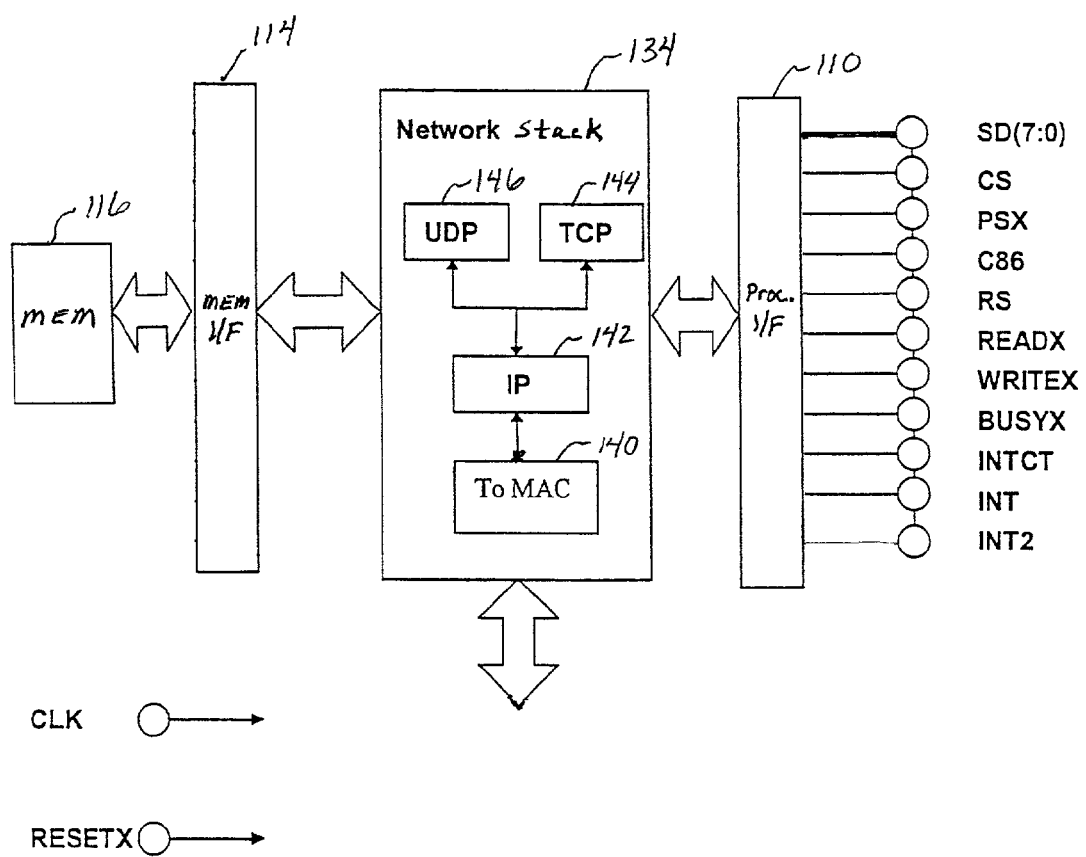
FIG. 4 is a more detailed block diagram of a TCP/IP stack of FIG. 3.

Referring to FIG. 4, a more detailed block diagram of the circuit 134 of FIG. 3 is shown. The circuit 134 may comprise a block (circuit) 140, a block (circuit) 142, a block (circuit) 144, and a block (circuit) 146. The block 140 may be configured to manage communication with the circuit 132. In one example, the circuit 140 may be implemented as a relatively simple FIFO bus. The block 142 may be configured to handle IP protocol tasks. The block 144 may be configured to handle TCP protocol tasks. The block 146 may be configured to handle UDP protocol tasks. The circuit 134 may be implemented with additional blocks (circuits) to handle other protocol tasks.

The circuit 142 may be configured for implementing normal IP layer processing, including (i) IP header generation and checking, (ii) detecting data packets with IP addresses directed to the system 100 and otherwise discarding the data packets, (iii) generating IP checksums for outgoing data packets, (iv) checking for valid IP header checksums on incoming data packets, (v) providing (optionally) IP fragmentation and defragmentation capability via the memory 116, (vi) confirming support protocols and packet lengths, and/or (vii) validating the TTL (Time To Live) field has not expired. The circuit 142 may be configured to communicate IP address field information contained in the IP header through the block 144 or the block 146 and circuit 136 to and from the circuit 106. The circuit 106 generally uses the information for the iSCSI/iFC mapping function.

The circuit 144 generally implements the TCP transport layer processing, including TCP header generation and checking. The circuit 144 may be configured to establish a "connection" with an associated state to another device through the IP connection. The circuit 144 generally supports multiple such independent connections. The "state" of a connection, as well as data packets being operated on, will generally be stored in the memory circuit 116 via the interface 114. The TCP processing may include, but is not limited to, (i) generation and checking of the TCP layer checksum, (ii) generation and checking of data packet sequence numbers and acknowledgments per the TCP specifications, and (iii) configurably managing the TCP window size according to various standards or proprietary requirements for increasing or decreasing the window in the face of bandwidth limitations (congestion) and errors. The circuit 144 may be configured to re-sequence received data packets in the correct order prior to delivery to circuit 136. The circuit 144 may be further configured to negotiate a maximum data packet size for the connection and break packets received from circuit 136 into multiple data packets conforming to this maximum packet size. As with circuit 142, the circuit 144 generally communicates TCP port information to and from the circuit 106 as necessary for the iSCSI/iFC mapping function. The above described functions are generally considered normal TCP functions.

The circuit 146 may be configured to implement the UDP header generation and checking functionality. Similarly to circuit 144, the circuit 146 generally provides port address information to and from circuit 106. The circuit 146 is generally configured to generate and/or check the UDP checksum and length in the UDP header for validity.

The interface 110 is implemented as a control interface from the external host circuit 112 to one or more control registers of circuits 140, 142, 144, and 146. The control registers are generally used for error reporting and configurability of the various circuits.

Figure 5:
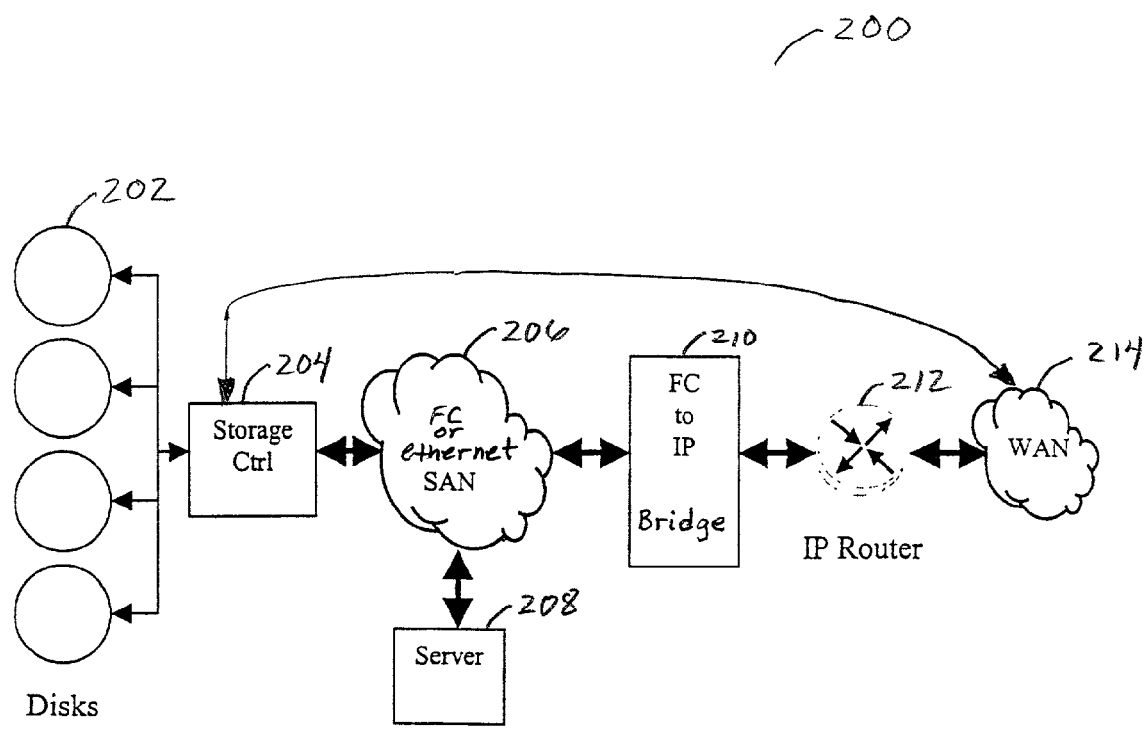
FIG. 5 is a block diagram illustrating example applications of the present invention.

Referring to FIG. 5, a block diagram of a SAN installation 200 is shown illustrating example applications in accordance with the present invention. The SAN installation 200 may comprise a number of storage devices 202 (e.g., disks, tape drives, etc.), a storage controller interface 204, a SAN 206, a server NIC interface 208, a bridge 210, and a router 212. The various parts of the SAN installation 200 may be connected, in one example, by Ethernet SAN switches (not shown). The Ethernet SAN switches may be implemented similarly to standard Ethernet switches. The SAN installation may be implemented with additional controllers, servers and bridges to meet the design criteria of a particular application. The present invention may allow the SAN 206 to be implemented as either a FC SAN or and ethernet SAN. The system 100 may be used to implement each of the storage controller interface 204, the server NIC 208, and the bridge 210. In one example, the storage controller interface 204 may be configured to couple the storage devices 202 to an ethernet SAN 206. Alternatively, the storage controller interface 204 may be configured to couple the storage devices 202 a WAN 214 via ethernet (e.g., for remote mirroring). The server NIC interface 208 may be configured to connect a server to an ethernet SAN 206. The bridge 210 may be configured to couple a fiber channel SAN 206 to the IP router 212.

When the system 100 is implemented as the storage controller interface 204, the system 100 may be implemented as a line card, or blade, in the storage controller that connects to either the WAN, or to an Ethernet SAN. The system 100 may be configured to connect an IP interface outside of the storage controller chassis to a bus connecting to the backplane inside the chassis. In the case of the WAN 214, the router 212 will generally be external to the storage controller, and the connection between the two will generally be ethernet at 1 Gbps or 10 Gbps rates. However, other rates may be implemented to meet the design criteria of a particular application. The system 100 may be configured to readily connect directly to the backplane while addressing multiple customers. For example, when the system 100 is connected to a proprietary backplane, the line card may comprise a PCI-x or other interface (e.g., SPI-4, a 10 Gbps interface promoted by the Optical Internetworking Forum).

When the system 100 is implemented as the bridge 210, the system 100 may comprises one or more additional controllers for Fibre Channel, SCSI, and/or possible IDE connectivity. The additional controllers may be implemented either externally or internally to the system 100.

Alternate embodiments of the present invention may include implementing a PCI or PCI-X bus in place of an RIO bus for HAB market and high speed NIC market (non-storage). The IPSec or SSL processing may be embedded. A processor (e.g., an ARM) may be embedded to off-load or eliminate the external host processor 112. The iSCSI/iFC/SCTP functionality may be implemented as part of the system 100. An embedded programmable logic circuit (EPLC) may be incorporated to more easily shift one part between uses (e.g., iSCSI, iFC, video over IP, etc.).

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
a media access controller (MAC);
a configurable packet switch;
a high bandwidth bus configured to couple said apparatus to (i) one or more external devices and (ii) a protocol mapper; and
a network protocol stack in silicon coupling said media access controller to said configurable packet switch.

2. The apparatus according to claim 1, wherein said network protocol stack comprises a TCP/IP stack.

3. The apparatus according to claim 2, wherein said network protocol stack comprises a TCP/IP/UDP stack.

4. The apparatus according to claim 1, further comprising:
a security port configured to couple an external security protocol processor to said apparatus.

5. The apparatus according to claim 1, further comprising: embedded SSL and IPSec processing functionality.

6. The apparatus according to claim 1, wherein said bus comprises a RapidIO (RIO) bus.

7. The apparatus according to claim 1, wherein said bus comprises a PCI bus, a PCI-X bus, or a SPI-4 bus.

8. The apparatus according to claim 1, wherein said protocol mapper comprises bus is configured to couple said apparatus to a iSCSI/iFC mapper.

9. The apparatus according to claim 8, wherein said iSCSI/iFC mapper comprises a programmable logic device configured to add and strip iSCSI and/or iFC protocol wrappers.

10. The apparatus according to claim 9, wherein said iSCSI/iFC mapper comprises an embedded programmable logic circuit (EPLC).

11. The apparatus according to claim 1, further comprising:
a buffer configured to couple said media access controller to said network protocol stack.

12. The apparatus according to claim 1, further comprising:
an interface circuit configured to couple said apparatus to a host processor.

13. The apparatus according to claim 1, further comprising an interface circuit configured to couple said network protocol stack to a memory.

14. The apparatus according to claim 13, wherein said interface circuit comprises a double data rate (DDR) interface.

15. The apparatus according to claim 1, wherein said media access controller is configured to couple said apparatus to a physical layer device having an operating speed configurable to any rate in the group consisting of 100 Mbps, 1 Gbps, and 10 Gbps.

16. The apparatus according to claim 1, wherein said media access controller (MAC) comprises an ethernet MAC.

17. The apparatus according to claim 1, wherein said configurable packet switch is configured to send SCSI packets to either a high speed bus port or a microprocessor.

18. An apparatus comprising:
means for coupling to a physical layer of a network;
means for sending packets to any of a plurality of locations;
means for coupling said apparatus to (i) one or more external devices and (ii) a protocol mapper, using a high bandwidth bus; and
means for running multiple protocol layers simultaneously at greater than 1 Gbps rates, said running means coupled between said coupling means and said sending means.

19. A method for coupling components of a storage area network (SAN) via an internet-work packet (IP) network comprising the steps of:
receiving and sending packets to a physical layer of said internet-work packet (IP) network;
running an IP protocol layer and at least one other protocol layer simultaneously at greater than 1 Gbps rates; and
sending SCSI packets to either a high speed bus port or a microprocessor and coupling said components to (i) one or more external devices and (ii) a protocol mapper, using a high bandwidth bus.

* * * * *